United States Patent
Masuda et al.

(10) Patent No.: US 10,443,653 B2
(45) Date of Patent: Oct. 15, 2019

(54) SLIDING MEMBER AND METHOD FOR MANUFACTURING SLIDING MEMBER

(71) Applicant: Senju Metal Industry Co., Ltd., Tokyo (JP)

(72) Inventors: Satoshi Masuda, Tochigi (JP); Takashi Akagawa, Tochigi (JP); Naoki Sato, Tochigi (JP); Ryoichi Kurata, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 80 days.

(21) Appl. No.: 15/024,595

(22) PCT Filed: Sep. 25, 2014

(86) PCT No.: PCT/JP2014/075476
§ 371 (c)(1),
(2) Date: Mar. 24, 2016

(87) PCT Pub. No.: WO2015/046355
PCT Pub. Date: Apr. 2, 2015

(65) Prior Publication Data
US 2016/0215819 A1    Jul. 28, 2016

(30) Foreign Application Priority Data
Sep. 27, 2013 (JP) ................... 2013-202303

(51) Int. Cl.
*C23C 4/02* (2006.01)
*C23C 4/08* (2016.01)
(Continued)

(52) U.S. Cl.
CPC .......... *F16C 33/125* (2013.01); *B32B 15/015* (2013.01); *C23C 4/02* (2013.01);
(Continued)

(58) Field of Classification Search
CPC .................... F16C 23/00; B32B 15/01
See application file for complete search history.

(56) References Cited

U.S. PATENT DOCUMENTS 5,545,489 A * 8/1996 Tanaka .................... C23C 22/08
428/629
5,592,840 A * 1/1997 Miyasaka ................ C21D 7/06
29/90.7
(Continued)

FOREIGN PATENT DOCUMENTS

DE    102010053338 A1    6/2012
JP        07190065 A    7/1995
(Continued)

Primary Examiner — Humera N Sheikh
Assistant Examiner — Xiaobei Wang
(74) Attorney, Agent, or Firm — The Webb Law Firm

(57) ABSTRACT

A sliding member having a supporting layer composed of an iron-based metallic material and a sliding layer formed on a surface of the supporting layer and composed of a copper-based metallic material. The surface of the supporting layer and the sliding layer have non-flat surfaces. A sliding surface having a non-flat surface is formed on the surface of the sliding layer. The sliding layer is formed on the roughened surface of the supporting layer by thermal spraying. The surface of the sliding layer is then subjected to a shot blasting treatment to form the sliding surface which has an uneven surface having an arithmetic average roughness (Ra) of more than 0 μm and 2.0 μm or less, a ten-point average roughness (Rz) of more than 0 μm and 7.5 μm or less and a surface hardness (Hv) of 150-250, and which slidably supports an object to be slid.

3 Claims, 5 Drawing Sheets

(51) Int. Cl.

| | | |
|---|---|---|
| *C23C 4/12* | (2016.01) | |
| *C23C 4/18* | (2006.01) | |
| *B32B 15/01* | (2006.01) | |
| *F16C 23/04* | (2006.01) | |
| *F16C 33/06* | (2006.01) | |
| *F16C 33/12* | (2006.01) | |
| *F16C 33/14* | (2006.01) | |
| *F16C 33/10* | (2006.01) | |

(52) U.S. Cl.
CPC .............. *C23C 4/08* (2013.01); *F16C 23/045* (2013.01); *F16C 33/06* (2013.01); *F16C 33/103* (2013.01); *F16C 33/12* (2013.01); *F16C 33/122* (2013.01); *F16C 33/14* (2013.01); *F16C 2202/04* (2013.01); *F16C 2204/10* (2013.01); *F16C 2204/12* (2013.01); *F16C 2223/08* (2013.01); *F16C 2223/42* (2013.01); *F16C 2240/40* (2013.01); *F16C 2240/54* (2013.01); *F16C 2240/60* (2013.01)

(56) References Cited

U.S. PATENT DOCUMENTS

| | | | |
|---|---|---|---|
| 5,958,522 A * | 9/1999 | Nakagawa | ................ C23C 4/08 427/455 |
| 6,294,029 B1 | 9/2001 | Sakate et al. | |
| 7,662,472 B2 * | 2/2010 | Tanaka | ................ F16C 33/201 384/276 |
| 9,303,230 B2 | 4/2016 | Tomikawa et al. | |
| 2003/0209103 A1 * | 11/2003 | Takayama | ............... C22C 32/00 75/231 |
| 2007/0009757 A1 * | 1/2007 | Takayama | ............. B22F 1/0003 428/644 |
| 2009/0004030 A1 * | 1/2009 | Sugioka | ............. F04B 27/1054 417/269 |
| 2009/0305917 A1 | 12/2009 | Tanizawa et al. | |
| 2009/0311476 A1 * | 12/2009 | Stetina | ..................... B05D 5/08 428/141 |
| 2011/0044572 A1 * | 2/2011 | Kano | ................ C23C 16/0281 384/625 |
| 2013/0216169 A1 * | 8/2013 | Zidar | ........................ C22C 9/00 384/276 |
| 2015/0049966 A1 * | 2/2015 | Sato | ........................ F16C 33/14 384/42 |

FOREIGN PATENT DOCUMENTS

| | | | | |
|---|---|---|---|---|
| JP | 10267033 A | 10/1998 | | |
| JP | 2000303161 A | 10/2000 | | |
| JP | 3425496 B2 | 7/2003 | | |
| JP | 2007284706 A | 11/2007 | | |
| JP | 5304974 B1 | 10/2013 | | |
| WO | 2013039177 A1 | 3/2013 | | |
| WO | WO2013146108 | * 10/2013 | ............... F16C 33/12 |

* cited by examiner

[FIG.1]
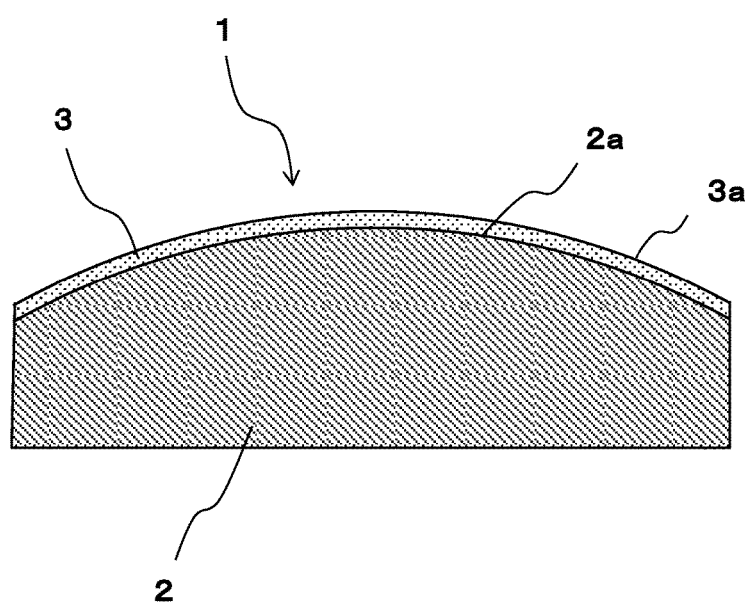

[FIG.2A]
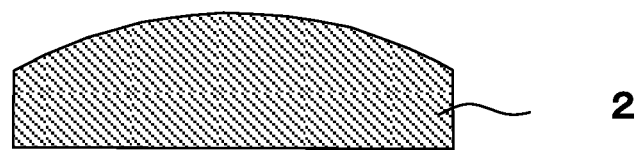
[FIG.2B]
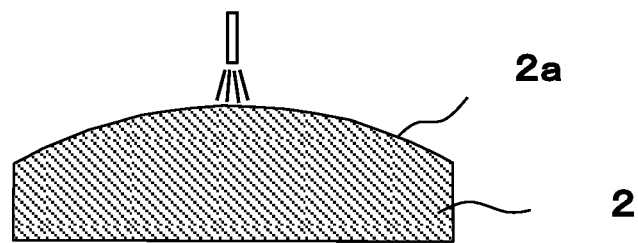
[FIG.2C]
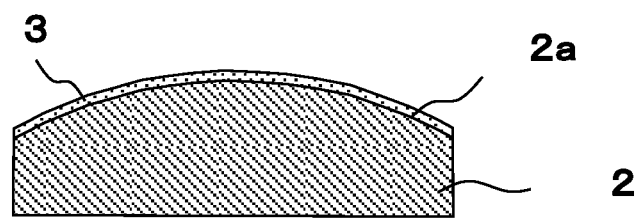
[FIG.2D]
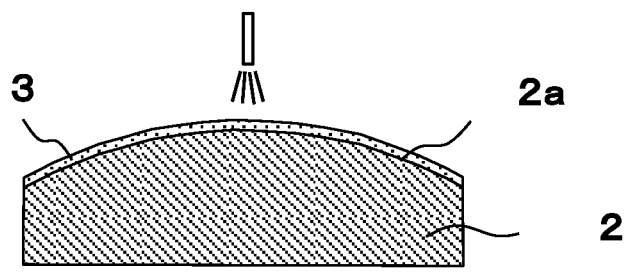
[FIG.2E]
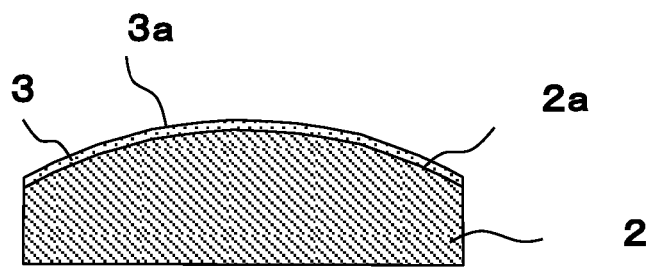

【FIG. 3A】
【FIG. 3B】
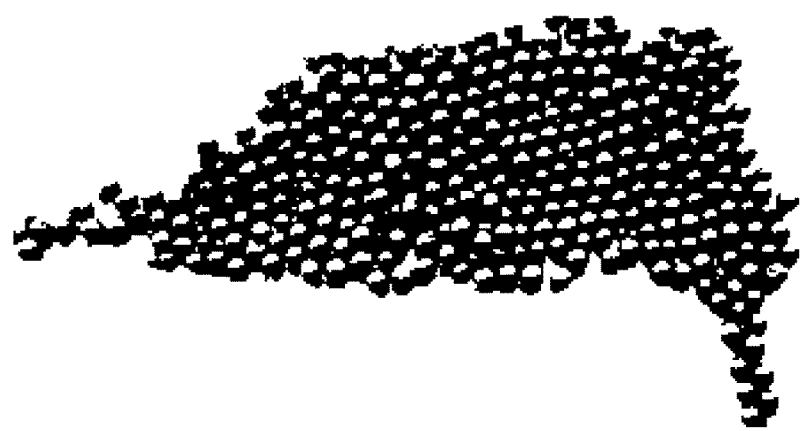

[ FIG. 4A ]
[ FIG. 4B ]
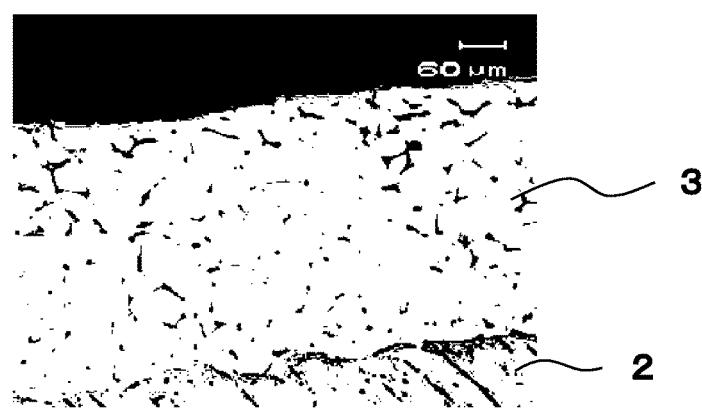

[ FIG. 5 ]
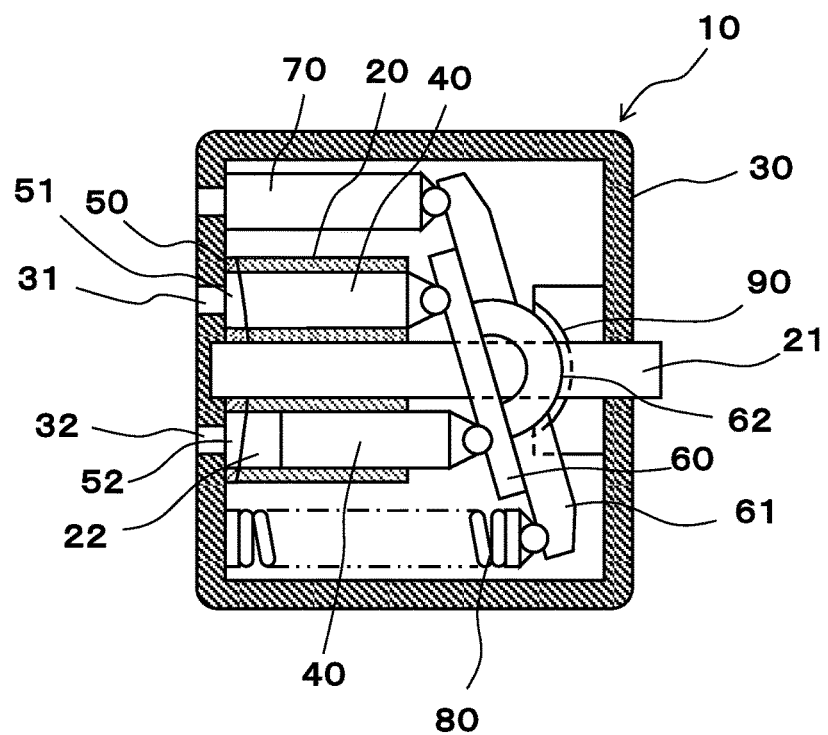

SLIDING MEMBER AND METHOD FOR MANUFACTURING SLIDING MEMBER

CROSS-REFERENCE TO RELATED APPLICATIONS

This application is the United States national phase of International Application No. PCT/JP2014/075476 filed Sep. 25, 2014, and claims priority to Japanese Patent Application No. 2013-202303 filed Sep. 27, 2013, the disclosures of which are hereby incorporated in their entirety by reference.

TECHNICAL FIELD

The present invention relates to a sliding member that slidably supports an object to be slid and a method for manufacturing the sliding member.

BACKGROUND

In the past, sliding members each having a sliding layer formed on a metallic base have been often used. For example, in the sliding member used for a motor vehicle or construction machinery, a steel plate having a strong mechanical strength has supported heavy load and a sliding layer has smoothly slid an object to be slid wherein the sliding layer is made of a copper-based alloy having a low mechanical strength but a lubricating property. For such a sliding member, a thermal spraying method has been proposed as a method of forming the sliding layer on a surface of a supporting layer when using a steal plate as the supporting layer. The thermal spraying method is that metal which is different from the metallic base and has a desired property is melted by combustion gas, plasm, arc or the like, and the melted metal is sprayed with compressed air from a nozzle and is applied to a surface of the metallic base for proving adhesion.

According to this thermal spraying method, because a metal is attached to the supporting layer by the thermal spraying, even if the supporting layer is a flat surface or any optional non-flat surface, such as a spherical surface, it is possible to form the sliding layer having a sliding surface along a shape of the supporting layer's surface (refer to, for example, Patent Document 1).

Patent Document 1: Japanese Patent No. 3425496

SUMMARY OF THE INVENTION

In the thermal spraying method disclosed in Patent Document 1, in order to make a strong joining strength of a metal joint between the first metal and the metallic base as matrix, which have been attached by the thermal spraying method, a cleaning process is performed for forcibly releasing and removing stains adhered to the metal surface.

In other words, in a case where an oxide, oil or the like stains a surface of the metallic base, even if the first metal is attached to the surface of the stained metallic base and they are thermally processed in an active atmosphere, the stain exists between the metallic base and the first metal and prevents a solid state diffusion between both the metals. Therefore, the metallic joining may be impossible.

Accordingly, based on such an idea that the surface of the metallic base should be in a clean condition as much as possible, the cleaning process has been performed for forcibly releasing and removing the stain adhered to the metal surface.

It is described that for the cleaning process of the metallic base, grinding or the like by sandblasting or a wire brush is available. However, in a case where the sliding member containing the supporting layer and the sliding layer joined by the thermal spraying method is used for an oil hydraulic pump or the like to which a higher load is applied, the additional joining strength between the supporting layer and the sliding layer has been required.

The present invention has an object to provide a sliding member having a joining strength suitable for a circumstance to which a heavy load is applied and to provide a method of manufacturing the sliding member.

The inventors of this application have found that a sliding layer can be formed on a surface of a supporting layer using the thermal spraying by roughening the surface of the supporting layer at which the supporting layer and the sliding layer are bounded, and the joining strength between the supporting layer and the sliding layer is improved with an anchoring effect of the roughened surface.

The present invention relates to a sliding member containing a supporting layer that is composed of a first metallic material, and a sliding layer that is formed by attaching a second metallic material to a roughened surface of the supporting layer with thermal spraying where the second metallic material is different from the first metallic material in composition. A sliding surface is formed on a surface of the sliding layer that is subjected to shot blasting. The sliding surface slidably supports an object to be slid and has an uneven shape having an arithmetic average roughness (Ra) of more than 0 μm but 2.0 μm or less, a ten-point average roughness (Rz) of more than 0 μm but 7.5 μm or less and a surface hardness (Hv) of 150-250.

It is preferable that the supporting layer is roughened by an impact processing wherein powder having a corner part with an acute angle collides with one surface of the supporting layer. Moreover, it is preferable that the sliding layer is densified by an impact processing wherein spherical shaped powder collides with one surface of the sliding layer. In addition, it is preferable that the first metallic material of the supporting layer is composed of an iron-based material and the second metallic material of the sliding layer is composed of a copper-based material. In addition, it is preferable that a surface roughness Ra of one roughened surface of the supporting layer is 2 μm or more. It is preferable that a thickness of the sliding layer is more than 0 μm but 1.5 mm or less.

The present invention also relates to a method for manufacturing a sliding member containing a step of roughening one surface of a supporting layer composed of a first metallic material, and a step of forming a sliding surface for slidably supporting an object to be slid along one surface of the supporting layer by attaching a second metallic material to the roughened surface of the supporting layer with thermal spraying and sintering it. The surface of the sliding layer is subjected to shot blasting treatment. After the shot blasting treatment, the sliding surface has an uneven shape having an arithmetic average roughness (Ra) of more than 0 μm but 2.0 μm or less, a ten-point average roughness (Rz) of more than 0 μm but 7.5 μm or less and a surface hardness (Hv) of 150-250. In the above-mentioned step of forming the sliding layer, since the shot blasting treatment is applied, the sliding layer is densified and a predetermined surface hardness is obtained. In the step of forming the sliding surface of the uneven shape having a predetermined surface roughness after the shot blasting treatment, for example, a process of rubbing the sliding member with the object to be slid together is performed and the sliding member and the object to be slid are used as a pair after the rubbing process.

According to the present invention, it is possible to improve the joining strength between the supporting layer and the sliding layer by roughening one surface of the supporting layer, where the supporting layer and the sliding layer are jointed, and attaining the metallic material to one surface of the supporting layer by the thermal spraying using an anchoring effect at the roughened surface to sinter the metallic material attached by the thermal spraying. Therefore, the sliding member which has the sliding layer not only with a flat surface but also with a non-flat surface may be formed.

Thereby, the sliding member which has the sliding surface not only with a flat surface but also with a non-flat surface, the sliding member having a two-layer configuration including the supporting layer having a function of mainly receiving a load and the sliding layer having a function of mainly improving the sliding property, may be formed.

BRIEF DESCRIPTION OF DRAWINGS

FIG. 1 is a cross sectional plane view of illustrating one example of a sliding member according to the subject embodiment.

FIG. 2A is a diagram illustrating one example of a process for manufacturing the sliding member according to the subject embodiment.

FIG. 2B is a diagram illustrating one example of the process for manufacturing the sliding member according to the subject embodiment.

FIG. 2C is a diagram illustrating one example of the process for manufacturing the sliding member according to the subject embodiment.

FIG. 2D is a diagram illustrating one example of the process for manufacturing the sliding member according to the subject embodiment.

FIG. 2E is a diagram illustrating one example of the process for manufacturing the sliding member according to the subject embodiment.

FIG. 3A is a photograph showing one example of metal powder used for the blasting treatment.

FIG. 3B is a photograph showing one example of metal powder used for the blasting treatment.

FIG. 4A is a microscope photograph of the sliding member according to the subject embodiment.

FIG. 4B is a microscope photograph of the sliding member according to the subject embodiment.

FIG. 5 is a diagram illustrating one example of a piston pump to which the sliding member of the subject embodiment is applied.

DESCRIPTION OF THE INVENTION

Embodiments of a sliding member and a method for manufacturing the sliding member of the subject invention will be described with reference to the attached drawings.
<Configuration Example of Sliding Member of Subject Embodiment>

FIG. 1 is a cross sectional plane view of illustrating one example of a sliding member according to the subject embodiment. FIGS. 2A, 2B, 2C, 2D and 2E are diagrams illustrating one example of a process for manufacturing the sliding member according to the subject embodiment.

A sliding member 1 according to the subject embodiment contains a supporting layer 2 composed of a first metallic material and a sliding layer 3 composed of a second metallic material which is different from the supporting layer 2 for improving a sliding property and the like. In this example, a sliding surface 3a formed on one surface of the sliding layer 3 is not a flat surface but is configured of, for example, a convex spherical surface.

The supporting layer 2 is composed of an iron (Fe) or an iron (Fe)-based alloy in which the iron is a primary component and any additives are added thereto as the first metallic material. In the supporting layer 2, its one surface 2a is configured of a convex spherical surface in order that the sliding surface 3a of the sliding layer 3 is configured of a convex spherical surface in this example.

In the sliding member 1, the surface 2a of the supporting layer 2 is roughened in order to improve the joining strength between the supporting layer 2 and the sliding layer 3. In the sliding member 1, the surface 2a of the supporting layer 2 is roughened by performing, for example, a first blasting treatment as a first impact processing wherein metal powder with predetermined particle size and shape is impacted to the surface 2a of the supporting layer 2. This is a surface-roughening treatment for roughening the surface 2a of the supporting layer 2.

The sliding layer 3 is composed of a copper (Cu) or a copper (Cu)-based alloy in which the cupper is a primary component and any additives are added thereto as the second metallic material of a predetermined metal composition for improving the sliding property. A Cu—Sn—Bi alloy, Cu—Sn alloy, Cu—Zn alloy and the like are supposed for the copper (Cu)-based alloy. The sliding layer 3 is formed by attaching the copper or the copper-based alloy to the surface 2a of the supporting layer 2 with thermal spraying, wherein the surface 2a exhibits the anchoring effect by the roughening, and by sintering the supporting layer 2 and the copper or the copper-based alloy attached by the thermal spraying.

Therefore, in the sliding member 1, the sliding layer 3 having a predetermined thickness is formed on the surface 2a of the supporting layer 2 along a shape of the surface 2a of the supporting layer 2, and the sliding surface 3a configured of the convex spherical surface is formed on the surface of the sliding layer 3.

Moreover, in the sliding member 1, the sliding layer 3 is densified in order to improve an abrasion resistance property. In the sliding member 1, the sliding layer 3 is densified by, for example, a second blasting treatment as a second impact processing wherein metal powder with predetermined particle size and shape which are different from those in the surface-roughening processing collides with the sliding surface 3 of the sliding layer 3. This is a densifying treatment for densifying the sliding layer 3.

In a case that the sliding layer is composed of the iron or the iron-based alloy in the sliding member, if the object to be slid touching the sliding member is made of the iron on the like, there is a burning possibility so that the sliding property is bad. Therefore, in the sliding member 1, the sliding property can be improved by providing with the sliding layer 3 composed of the copper or the copper-based alloy on the surface 2a of the supporting layer 2 composed of the iron or iron-based alloy.

The sliding layer 3 is formed by attaching the copper or the copper-based alloy to the surface 2a of the supporting layer 2 with the thermal spraying and sintering the supporting layer 2 and the sliding layer 3. Therefore, the sliding layer 3 having a predetermined thickness can be formed on the surface 2a of the supporting layer 2 that has not a flat surface shape but is configured of, for example, the convex spherical surface.

When the sliding layer 3 is formed by the thermal spraying, there is a possibility that the joining strength becomes insufficient in accordance with a condition of the surface 2a of the supporting layer 2. So, by performing the thermal spraying of the copper or the copper-based alloy on the surface 2a of the supporting layer 2 roughened by the first blasting treatment to form the sliding layer 3, it is possible to maintain the joining strength between the supporting layer 2 and the sliding layer 3 wherein this strength is required for the sliding member 1.

Further, in the sliding member 1, because the sliding layer 3 is densified by the second blasting treatment, the hardness of the sliding layer 3 can be improved. Then, the sliding layer 3 can be formed wherein the sliding layer 3 has a desired hardness required for a circumstance to which a heavy load is applied. In the sliding member 1, the sliding layer 3 is densified by the second blasting treatment so that the sliding layer 3 having a desired thickness is formed. Moreover, in the sliding member 1, the sliding layer 3 is densified by the second blasting treatment to improve its hardness so that the joining strength can be improved by roughening the surface 2a of the supporting layer 2 and the joining strength between the supporting layer 2 and the sliding layer 3 can be further improved.

After the sliding layer 3 is densified by the second blasting treatment, the sliding member 1 is rubbed with the object to be slid (not shown) that is a part of the pair. As a result of the rubbing process, the sliding surface 3a is formed on the surface of the sliding surface 3. The sliding surface 3a has the uneven shape having an arithmetic average roughness (Ra) of more than 0 μm but 2.0 μm or less, a ten-point average roughness (Rz) of more than 0 μm but 7.5 μm or less and a surface hardness (Hv) of 150-250. For the treatment of the surface to be slid of the object to be slid, the blasting treatment for the densification may be applied or not be applied. In addition, a plating step called an overlay may be added after the rubbing process. After the rubbing step, the sliding member 1 and the object to be slid become the pair and they are used for a bearing of a cylinder block in a piston pump that will be described hereinafter.

This rubbing process reduces a friction coefficient between the sliding surface 3a of the sliding layer 3 in the sliding member 1 and the surface to be slid of the object to be slid (not shown). Thus, the friction at a starting time of the piston pump is reduced in the example where it is set in the bearing of the cylinder block in the piston pump. Because if the thickness of the sliding layer 3 is too thick, it breaks easily but if this thickness is thin, it is hard to break and its heat conductivity becomes good, it is formed to have the thickness of more than 0 mm but 1.5 mm or less, preferably more than 0 but 0.1 mm or less. Since the thickness of the sliding layer 3 is thin, its heat conductivity is improved and its strength is close to the iron (Fe)-based alloy for the supporting layer 2. Therefore, its fatigue strength can be improved.

<Example of Method for Manufacturing Sliding Member of Embodiment>

A method for manufacturing the sliding member according to the subject embodiment will be described with reference to each drawing.

The supporting layer 2 is composed of the iron or the iron-based alloy. As shown in FIG. 2A, the surface 2a of the supporting layer 2 is molded to meet the shape of the sliding member 1 as a completed product. In this example, the supporting layer 2 has a disk shape and the surface 2a of the supporting layer 2 is formed as a convex spherical surface having a predetermined radius.

The surface 2a of the supporting layer 2 is roughened by performing the first blasting treatment wherein the metal powder having the predetermined particle size and shape collides with the surface 2a of the supporting layer 2 as shown in FIG. 2B. This is the surface roughening processing for roughening the surface 2a of the supporting layer 2.

FIGS. 3A and 3B are photographs showing one example of the metal powder used for the blasting treatment wherein FIG. 3A shows the metal powder called a steel grid and FIG. 3B shows the metal powder called a steel shot. In the first blasting treatment of this example, the iron (Fe) powder (refer to FIG. 3A) called the steel grid is sprayed to the surface 2a of the supporting layer 2 with, for example, 02-0.7 MPa. The iron powder has the corner part with the acute angle and the particle size of 425-1180 μm and the hardness of 400-500 Hv. Because of the first blasting treatment, the surface roughness Ra (arithmetic average roughness stipulated by JIS B0601-1994) of the surface 2a of the supporting layer 2 is 2 μm or more. If it is 2 μm or less, the anchoring effect cannot appear. In this case, as the result of the thermal spraying, a partial separation or a whole separation appears and the sliding layer 3 cannot be formed.

Next, the powder of the copper or the copper-based alloy is attached to the surface 2a of the roughened supporting layer 2 by the thermal spraying as shown in FIG. 2C. Then, the supporting layer 2 and the copper or the copper-based alloy attached to the surface 2a of the supporting layer 2 by the thermal spraying are sintered. In this example, the copper powder having the particle size of 45 μm or less is melted and it is sprayed to the roughened surface 2a of the supporting layer 2. In this example, the Cu—Sn—Bi-based Cu alloy is used for the copper powder.

Next, the second blasting treatment is executed by allowing the metal powder having the predetermined particle size and shape to colliding with the sliding surface 3a of the sliding layer 3 as shown in FIG. 2D. This is the densifying treatment for densifying the sliding layer 3. In this example, the second blasting treatment is carried out by spraying the spherical iron powder (refer to FIG. 3B) called the steel shot having the particle size of 1000-1700 μm and the hardness of 400-500 Hv to the sliding surface 3a of the sliding layer 3 with, for example, 0.2-0.7 MPa.

The second blasting treatment is to apply a pressure for eliminating an air gap portion of the sliding layer 3 and to densify the sliding layer 3 by reducing the air gap portion. FIGS. 4A and 4B are microscope photographs of the sliding member according to the subject embodiment wherein FIG. 4A shows a state after the sinter but before the second blasting treatment and FIG. 4B shows a state after the second blasting treatment.

As shown in FIGS. 4A and 4B, it is seen that the air gap portion after the second blasting treatment is reduced by comparison with the case before the second blasting treatment. In this example, the hardness of the sliding surface 3a of the sliding layer 3 was about Hv 30 after the sinter but before the second blasting treatment, but it was improved to about Hv 160-175 after the second blasting treatment. Further, the uneven shape was formed on the sliding surface 3a after the second blasting treatment, wherein the uneven shape has the arithmetic average roughness (Ra) of more than 0 μm but 2.5 μm or less and the ten-point average roughness (Rz) of more than 0 μm but 10.0 μm or less. This example formed the uneven shape having the arithmetic average roughness (Ra) of 0.345 μm and the ten-point average roughness (Rz) of 1.166 μm.

Thus, in the sliding member 1, as shown in FIG. 2E, the sliding layer 3 having the predetermined thickness is formed on the surface 2a of the supporting layer 2 along the shape of the surface 2a of the supporting layer 2. In addition, the sliding surface 3a is formed on the surface of the sliding layer 3 wherein the sliding surface 3a has the predetermined hardness and is configured of the convex spherical surface.

Although, in the sliding member 1 of the subject embodiment, a case where the shape of the sliding surface 3a of the sliding member 1 having the disk shape is the convex spherical surface as the shape of the sliding surface 3a having non-flat surface has been described, a concave spherical surface may be available and the sliding surface may be a flat surface. In addition, the sliding member 1 is not limited to the circular shape but it may be, for example, a square shape having the sliding surface configured of a curved surface of the convex or concave shape.

In the example, the first impact processing has been described as the first blasting treatment. The object of the first impact processing is to roughen the surface 2a of the supporting layer 2 to accomplish the anchoring effect during the thermal spraying. Therefore, if the material has the corner part with the acute angle, it is not limited to the iron powder. For example, a glass bead, cut wire, silica sand, alumina, zirconia, silicon carbide and the like may be used.

Moreover, the copper powder may be used for the second blasting treatment. In the blasting treatment with the copper powder, the copper powder has the particle size of about 350 μm and the relatively soft hardness of 80-120 Hv so that it can prevent the surface of the sliding layer 3 from abraded wound. Therefore, it can perform quickly a step of forming the sliding surface 3a having the predetermined surface roughness on the surface of the sliding layer 3 by the rubbing operation of the sliding member 1 and the object to be slid after the second blasting treatment.

After the above-mentioned second blasting treatment, the rubbing operation is accomplished for the sliding member 1 and the object to be slid (not shown) wherein both of them make the pair. As a result of the rubbing operation, the sliding surface 3a is formed on the surface of the sliding layer 3. The sliding surface 3a has the uneven shape having the arithmetic average roughness (Ra) of more than 0 μm but 2.0 μm or less and the ten-point average roughness (Rz) of more than 0 μm but 7.5 μm or less. This example formed the sliding surface 3a having the arithmetic average roughness (Ra) of 0.173 μm and the ten-point average roughness (Rz) of 1.041 μm. On the other hand, even after the rubbing operation, the surface hardness (Hv) of the sliding surface 3a was about 160-175. By comparison with the state after the second blasting treatment but before the rubbing operation, it was not seen that the surface hardness (Hv) was reduced.

<Application Example of Sliding Member According to Subject Embodiment>

The sliding member 1 of the subject embodiment is formed by a two-layer configuration containing the supporting layer 2 for the function of mainly receiving the load and the sliding layer 3 for the function of mainly improving the sliding property. The sliding surface 3a may be configured of any desired shape, such as the spherical surface and the like.

Therefore, the sliding member 1 of the subject embodiment is preferable to be applied especially to hydraulic equipment such as an oil hydraulic pump having a self-aligning function. FIG. 5 is a typical cross sectional side view illustrating a configuration of one example of a piston pump as one example of the hydraulic equipment to which the sliding member of the subject embodiment is applied.

In a piston pump 10, a cylinder block 20 is attached to a case 30 with it being supported by an input shaft 21 and the cylinder block 20 is rotated by a driving force transferred through the input shaft 21. A plurality of cylinders 22 are provided on a rotation direction in the cylinder block 20. A piston 40 is provided in each of the cylinders 22 so that the piston can be taken in and out.

The piston pump 10 is provided with a spherical bearing 50 that rotatably supports the cylinder block 20. The sliding member 1 of the subject embodiment is applied to the spherical bearing 50 and the sliding surface with the cylinder block 20 is configured to be the convex spherical surface having the predetermined radius. In the cylinder block 20 as the object to be slid, the sliding surface with the spherical bearing 50 is configured to be the concave spherical surface.

The spherical bearing 50 is provided with an inlet port 51 and a discharge port 52 that are opened along a rotation direction of the cylinder block 20. The inlet port 51 is communicated to a suction opening 31 provided at the case 30, and the discharge port 52 is communicated to a discharge opening 32 of the case 30. The spherical bearing 50 is mounted between the cylinder block 20 and the case 30.

The spherical bearing 50 rotates under a condition that the cylinder block 20 is depressed in the shaft direction so that the cylinder block 20 and the spherical bearing 50 slide relatively. When any force is applied to the cylinder block 20 along the radial direction, the spherical bearing 50 keeps the condition that the spherical bearing 50 contacts the sliding surface of the cylinder block 20 and the cylinder block 20 is inclined with respect to the shaft direction.

The piston pump 10 is provided with a swash plate 60 that takes the piston 40 in and out with respect to the cylinder 22 of the cylinder block 20 in accordance with the rotation of the cylinder block 20. The piston pump 10 is also provided with a yoke 61 that changes an angle of the swash plate 60, and an operating piston 70 and a return spring 80 that drive the swash plate 60 and the yoke 61.

In accordance with the rotation of the cylinder block 20, the piston pump 10 sucks an oil by the cylinder 22 where the piston 40 projected from the cylinder block 20 and discharges the oil by the cylinder 22 where the piston runs in it. In the piston pump 10, by changing the angle of the swash plate 60 and the yoke 61, the stroke of the piston 40 changes so that the discharging volume of the oil is configured to be adjustable.

In the piston pump 10, a half bearing 90 is provided in the case 30 to support the swash plate 60 and the yoke 61 swingably. In the half bearing 90, a shaft portion 62 of the yoke 61 acts as an object to be slid and is swung under a condition it is pressed in a circumferential direction. Therefore, the shaft portion 62 and the half bearing 90 slide relatively.

In a configuration where the cylinder block 20 rotates in a single direction, the piston pump 10 is configured such that the oil suction and discharge sides are fixed. In a configuration where the cylinder block 20 rotates in both forward and reverse directions, the piston pump 10 is configured such that the oil suction and discharge sides can be switched. In the spherical bearing 50, the cylinder block 20 slides in one direction or both forward and reverse directions on the circumference direction thereof under a condition that the cylinder block 20 is pressed in the shaft direction and the heavy load is applied thereto. This enables the cylinder block 20 and the spherical bearing 50 to slide in a circular direction under the heavy load condition.

In the cylinder block 20 and the spherical bearing 50, when the cylinder block 20 receives the force in the radial direction, the self-aligning function works because the sliding surface is the spherical surface. Therefore, this keeps the condition where the spherical bearing 50 contacts the sliding surface of the cylinder block 20, and the cylinder block 20 slants with respect to the shaft direction.

Therefore, even if the cylinder block 20 receives the force in the radial direction, it is suppressed to produce a gap between the cylinder 22 provided at the cylinder block 20 and the inlet port 51 and the discharge port 52 which are provided at the spherical bearing 50. In addition, the oil leak is suppressed.

In the configuration of the piston pump 10, an oil discharge rate is variable because the swash plate 60 and the yoke 61 swing in both the forward and reverse directions. In the half bearing 90, the shaft portion 62 slides along the circumferential direction in both the forward and reverse directions under the condition where the shaft portion 62 of the yoke 61 is pressed in the circumferential direction and the half bearing 90 receives the heavy load. Therefore, the shaft portion 62 and the half bearing 90 slide in a straight direction under the heavy load condition.

Further, although, in the piston pump 10 of the subject embodiment, the case where the sliding member 1 of the subject embodiment is applied to the spherical bearing 50 has been described, the shape is not limited thereto; the sliding member 1 of the subject embodiment can be applied to the half bearing 90 and the like.

The sliding member of the present invention is preferably applied to the bearing of the hydraulic equipment to which the heavy load is applied.

The invention claimed is:

1. A method for manufacturing a sliding member, comprising:
    roughening one surface of a supporting layer composed of an iron-based material by subjecting said surface of said supporting layer to a first shot blasting treatment;
    forming an impact-hardened sliding surface for slidably supporting an object to be slid along one surface of said supporting layer by attaching a sliding layer to the roughened surface of said supporting layer with thermal spraying, wherein said sliding layer consists of copper or a copper alloy;
    sintering the iron-based material and the sliding layer; and
    subjecting the surface of said sliding layer to a second shot blasting treatment to reduce an air gap portion of said sliding layer and densify said sliding layer, wherein after impact-hardening by the shot blasting treatment to the surface of the sliding layer, said sliding surface has an uneven shape, the sliding surface exhibiting an arithmetic average roughness (Ra) of more than 0 μm and 2.0 μm or less, a ten-point average roughness (Rz) of more than 0 μm and 7.5 μm or less and a surface hardness (Hv) of 150-250.

2. The method of claim 1, wherein roughening one surface of the supporting layer comprises colliding a metal powder with the one surface of the supporting layer.

3. The method of claim 1, wherein the sliding layer consists of a Cu—Sn—Bi alloy, a Cu—Sn alloy, or a Cu—Zn alloy.

* * * * *